United States Patent
Zepeniuk

(12) 
(10) Patent No.: US 11,700,061 B1
(45) Date of Patent: Jul. 11, 2023

(54) APPARATUS FOR SYNCHRONIZING OPERATION OF OPTICAL SENSORS AND A METHOD FOR USING SAME

(71) Applicant: INUITIVE LTD., Ra'anana (IL)

(72) Inventor: Dor Zepeniuk, Kfar Hess (IL)

(73) Assignee: INUITIVE LTD., Ra'anana (IL)

( * ) Notice: Subject to any disclaimer, the term of this patent is extended or adjusted under 35 U.S.C. 154(b) by 0 days.

(21) Appl. No.: 17/713,531

(22) Filed: Apr. 5, 2022

(51) Int. Cl.
  *H04B 10/272* (2013.01)
  *H04B 10/079* (2013.01)

(52) U.S. Cl.
  CPC ..... *H04B 10/272* (2013.01); *H04B 10/07957* (2013.01)

(58) Field of Classification Search
  None
  See application file for complete search history.

(56) References Cited

U.S. PATENT DOCUMENTS

| | | | |
|---|---|---|---|
| 2007/0177011 A1* | 8/2007 | Lewin | B62D 15/0285 348/135 |
| 2016/0084642 A1* | 3/2016 | Bradski | B25J 9/1612 348/136 |
| 2016/0288330 A1* | 10/2016 | Konolige | G06T 1/0014 |
| 2019/0193267 A1* | 6/2019 | Peng | B25J 9/1676 |
| 2021/0209943 A1* | 7/2021 | Uçar | E01F 13/02 |

* cited by examiner

*Primary Examiner* — David W Lambert
(74) *Attorney, Agent, or Firm* — Browdy and Neimark, PLLC

(57) ABSTRACT

A central unit is provided which is operative in a system that comprises a plurality of moveable devices, each comprising an optical depth sensor. The central unit comprises a processor adapted to: divide the moveable devices into a plurality of groups, wherein each of the groups is characterized by a specific wavelength range at which all projecting modules associated with the optical depth sensors of the moveable devices belonging to that group, are operative; establish a time frame within which each of the optical depth sensors of the moveable devices will operate, wherein the time frame comprises a plurality of time slots; and associate at least two of the moveable devices with a single time slot, wherein each of the at least two moveable devices belongs to a different group than the other.

15 Claims, 2 Drawing Sheets

APPARATUS FOR SYNCHRONIZING OPERATION OF OPTICAL SENSORS AND A METHOD FOR USING SAME

TECHNICAL FIELD

The present disclosure generally relates to systems and methods using optical devices, and more particularly, to increase the number of devices, each comprising an optical depth sensor, operating within a given area.

BACKGROUND

There are various scenarios in which a plurality of moveable devices, each comprising an active depth sensor (e.g., robots, drones and the like), are operative within a given area (e.g., in a warehouse). Under these scenarios, a projection module of an optical sensor comprised in one such a device will have an adverse effect on the sensing capabilities of an optical sensor comprised in another device, and consequently will cause an undesirable impact upon the operation of the latter.

Our co-pending application 17/713,517 proposes a solution that enables operation within a confined space of a plurality of moveable devices, each comprising an optical sensor, while mitigating potential interferences between the active optical sensors. The solution disclosed in this co-pending application of ours, relies on using a time division ("TD") technique. In accordance with this technique, time frames are established, each time frame is divided into a plurality of time slots, and each time slot is dedicated for use by a respective optical sensor.

However, this solution may still be limited in the number of potentially operative optical sensors located within a confined space. For example, assume we use a rate of 30 frames per second ("fps") so that if we need a 6 msec operational time for each optical sensor within a time frame, we shall be limited to 5 devices/optical sensors within that confined space.

In order to overcome this problem, the present solution is aimed to provide an apparatus and a method for increasing the number of operational optical depth sensors within such a confined space.

SUMMARY OF THE DISCLOSURE

The disclosure may be summarized by referring to the appended claims.

It is an object of the present disclosure to provide an apparatus and a method to enable mitigating optical interferences between a relatively large number of adjacent moveable devices operating within a physical proximity.

It is another object of the present disclosure to provide an apparatus and a method that enable synchronizing the operation of a relatively large number optical depth sensors of adjacent moveable devices.

It is another object of the present disclosure to provide an apparatus and a method for managing communications between that apparatus and moveable devices.

Other objects of the present invention will become apparent from the following description.

According to a first embodiment of the disclosure, there is provided a central unit configured to operate in a system that comprises a plurality of moveable devices, each comprising at least one optical depth sensor, wherein the central unit is characterized in that it comprises at least one processor adapted to:

divide the plurality of moveable devices associated with a respective plurality of optical depth sensors into a plurality of groups (e.g., 2-4 groups), wherein each of the plurality of groups is characterized by a specific (unique) wavelength range at which ail projecting modules (e.g., laser, LED., etc.) associated with optical depth sensors of the moveable devices belonging to that group, are configured to operate;

establish a time frame within which each of the plurality of optical depth sensors of the moveable devices are able to operate, wherein the time frame comprises a plurality of time slots; and associate at least two of the moveable devices with a single time slot, wherein each of the at least two moveable devices belongs to a different group from among the plurality of groups.

In the above disclosure, it is described that the moveable devices are associated with respective groups, each having a different wavelength range at which the corresponding optical depth sensors of the moveable devices that belong to that group are operative. However, the division into groups may be done alternatively by dividing the optical depth sensors into the various groups instead of the moveable devices in which they are comprised based on their own operational wavelength. It should be understood by those skilled in the art, that this option is also encompassed by the present invention, all without departing from its scope.

According to yet another embodiment of the disclosure, in case there are fewer moveable devices associated with a first group of the plurality of groups than moveable devices associated with a second group of said plurality of groups, the at least one processor is configured to enable allocation of two or more time slots within a single time frame to one moveable device that belongs to the first group.

By still another embodiment, the at least one processor is configured to allocate a time slot from among the plurality of time slots comprised within a single time frame, to moveable devices, wherein each moveable device is selected from a different group of the plurality of groups, and wherein no more than one time slot is allocated to a single moveable device.

In accordance with another embodiment of the disclosure, each of the plurality of optical depth sensors is included in a group selected from among the plurality of groups, wherein that group is selected based on a wavelength at which a projection module associated with a respective optical depth sensor is configured to operate.

According to still another embodiment, the central unit further comprises a transmitter configured to enable communication between the plurality of moveable devices and the central unit.

In accordance with another embodiment, the communication between the plurality of moveable devices and the central unit is adapted to enable synchronizing a start of time frames for the plurality of moveable devices and to overcome time drift s while operating the plurality of moveable devices.

According to yet another embodiment of the disclosure, the communication between each of the plurality of moveable devices and the central unit is established every pre-defined period.

By still another embodiment, once a communication is established between the central unit and one of the plurality of moveable devices, the central unit is further configured to identify the moveable device being in communication with the central unit.

In an alternative embodiment, communications are broadcasted by the central unit to the plurality of moveable devices and wherein each of the communications includes an identification of a specific moveable device as well as information required for the operation of that specific moveable device.

In accordance with another embodiment, the transmitter of the central unit is an optical transmitter, configured to transmit optical signals towards the plurality of the moveable devices.

In the alternative, the transmitter of the central unit is a wireless transmitter, configured to transmit radio frequency signals towards the plurality of moveable devices.

According to another embodiment, the central unit is further provided with a charger, adapted to charge one or more of the plurality of moveable devices.

In accordance with still another embodiment, the moveable devices are members selected from a group that consists of robots, drones and any combination thereof.

According to another aspect of the disclosure, there is provided a method for mitigating interferences between optical depth sensors operating in a system that comprises a central unit and a plurality of moveable devices, wherein each of the plurality of moveable devices comprises at least one optical depth sensor, the method comprises the steps of:

dividing the plurality of moveable devices into a plurality of groups, wherein each of the plurality of groups is characterized by a specific wavelength range at which all projecting modules associated with the optical depth sensors of the moveable devices belonging to that group, are configured to operate;

establishing a time frame within which each of the plurality of optical depth sensors of the moveable devices are able to operate, wherein the time frame comprises a plurality of time slots; and associating at least two of the plurality of moveable devices with a single time slot, wherein each of the at least two moveable devices, belongs to a different group than the other, from among the plurality of groups.

In the above disclosure, it is described that the moveable devices are associated with respective groups, each having a different wavelength range at which the corresponding optical depth sensors of the moveable devices that belong to that group are operative. However, the division into groups may be done alternatively by dividing the optical depth sensors into the various groups instead of the moveable devices in which they are comprised, based on their own operational wavelength. It should be understood by those skilled in the art, that this option is also encompassed by the present invention, all without departing from its scope.

According to yet another embodiment of this aspect of the disclosure, in case there are fewer moveable devices associated with a first group of the plurality of groups than moveable devices associated with a second group of said plurality of groups, the method further comprising a step of allocating two or more time slots within a single time frame to one moveable device that belongs to the first group.

By still another embodiment of this aspect of the disclosure, the method further comprising a step of allocating a time slot from among the plurality of time slots comprised within a single time frame, to moveable devices, wherein each moveable device is selected from a different group of the plurality of groups, and wherein no more than one time slot is allocated to a single moveable device.

In accordance with an embodiment of this aspect of the disclosure, the method provided further comprises the steps of:

transmitting, by the central unit, signals towards the plurality of moveable devices, wherein the signals identify a time base for the operation of the optical depth sensors, a number of time frames to be implemented within a predefined period of time, and time slots within the time frames allocated to each of the optical depth sensors; and upon receiving the signals transmitted by the central unit, each of the plurality of moveable devices adjusts its time base for operating its own optical depth sensor to the one provided by the central unit, and synchronizes its operational time slot to the one allocated for its operation.

By yet another embodiment of this aspect of the disclosure, the method provided further comprises a step wherein the central unit is configured to identify specific moveable devices based on information comprised in barcodes associated with the specific moveable devices.

BRIEF DESCRIPTION OF THE DRAWINGS

For a more complete understanding of the present invention, reference is now made to the following detailed description taken in conjunction with the accompanying drawing wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

One of the problems addressed by the present disclosure is a problem that often arises in different cases, i.e., when devices that comprise active optical depth sensors are moving within a confined space, for example robots or drones in a warehouse. In such a case, the projection modules which operate, each in a respective active optical depth sensor, interfere with the sensing capabilities of the other, which in turn results in errors that occur in determining for example the location of the moving devices. This is particularly true when there is a large number of these devices moving around within that confined space.

Figure 1:
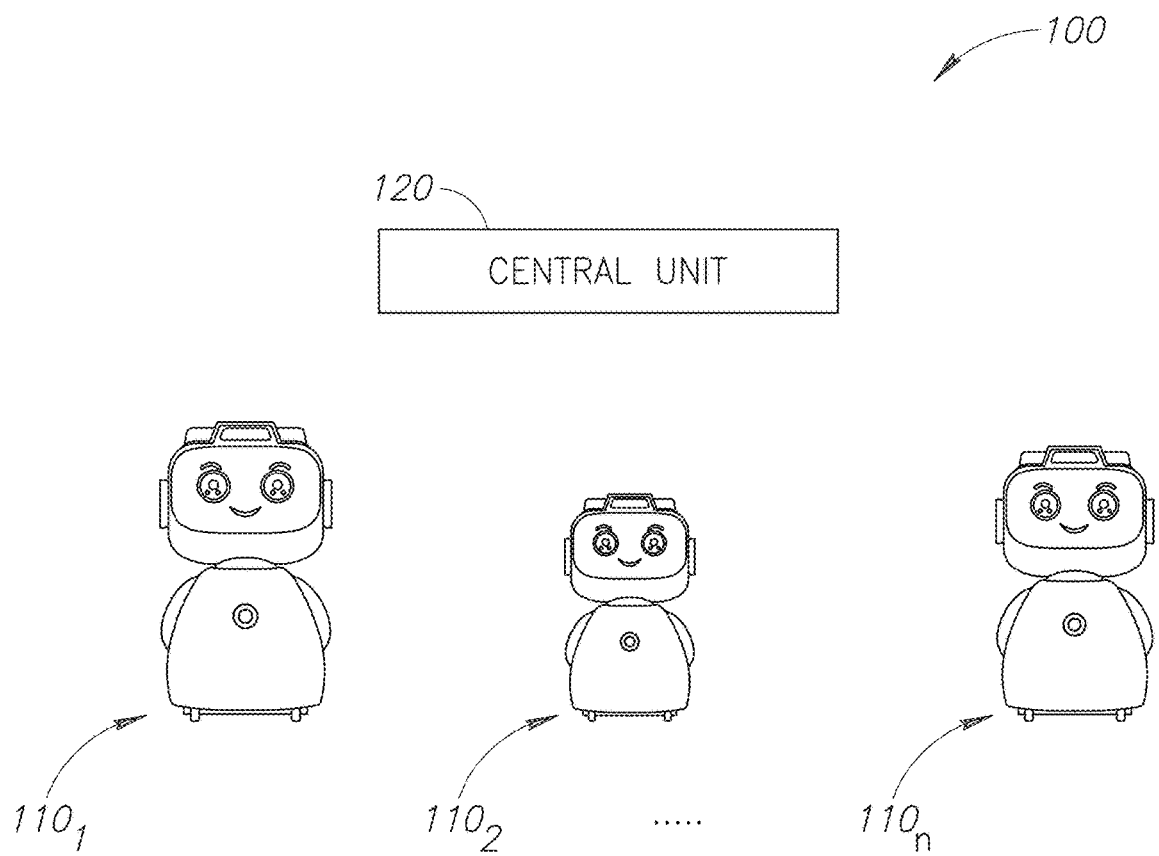
FIG. 1—illustrates a schematic presentation of a system construed in accordance with an embodiment of the present invention.

FIG. 1 illustrates a schematic presentation of a system construed in accordance with an embodiment of the present invention. System 100 illustrated in this figure comprises a plurality of robots 110$_1$, 110$_2$. . . , (moveable devices) which are operative within a confined space such as a warehouse (not shown in this figure). System 100 further comprises a central unit (i.e., a central platform) 120 that is configured to manage and synchronize the operations of the optical sensors in a way that reduces substantially any possible interference which might otherwise occur due to the operation of the optical sensors of the moveable objects while being located adjacent to each other.

Figure 2:
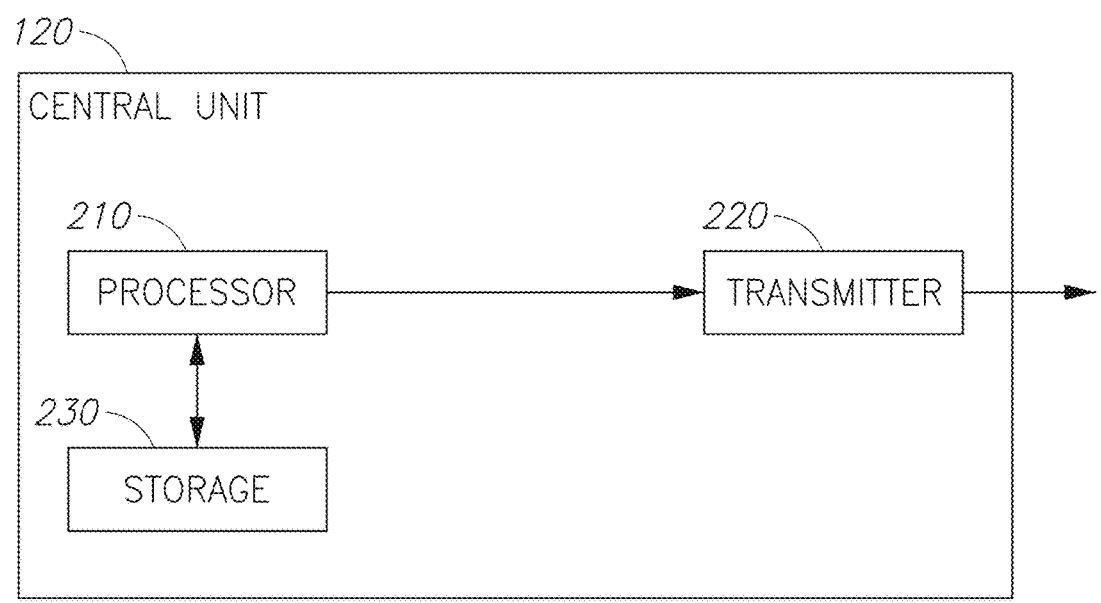
FIG. 2—illustrates a schematic presentation of an embodiment of a central unit comprised in the system depicted in FIG. 1.

A more detailed schematic view of the central unit 120 is illustrated in FIG. 2, and an example of its operation is described in the following disclosure.

First, the central unit is provided with data that relates to the wavelength at which each of the projection modules of the robots' optical depth sensors is operative. Upon receiving this information, processor 210 of central unit 120 divides the plurality of robots $110_1, 110_2 \ldots 110_n$ into two or more groups, based on the operational wavelength of their respective projection modules. Preferably, but not necessarily, the groups are determined so that each group will include robots that operate at a wavelength within certain wavelength range, wherein each group is associated with a wavelength range that does not overlap any wavelength included in another group' wavelength range. For example, the moveable devices may be divided into two groups, one of which comprises moveable devices having optical sensors (i.e., their respective projection. modules) operative at a wavelength within the range of from 645 nm to 855 nm, and the other of the two groups comprises moveable devices having optical sensors operative at a wavelength within the range of from 856 nm to 865 nm.

However, as will be appreciated by those skilled in the art, the length of the wavelength range of the different groups does not have to be equal for all groups, but it will preferable be determined to ensure that each Group includes a similar number of robots as the other groups, thereby obtaining an improved utilization of the system resources. For example, let us assume that there are twenty robots that are operative within the same confined space. Then let us assume that the projection modules of robots $110_1, 110_2$, and $110_3$ operate at 845 nm, the projection modules of robots $110_4, 110_5, 110_6$, and $110_7$ operates at 848 nm, the projection modules of robots $110_8, 110_9$, and $110_{10}$ operate at 850 nm, the projection modules of robots $110_{11}, 110_{12}$ operate at 855 nm, the projection modules of robots $110_{13}, 110_{14}, 110_{15}, 110_{16}, 110_{17}, 110_{16}$, and $110_{19}$ operate at 857 nm and the projection module of robot $110_{20}$ operates at 864 nm. For this example, processor 210 may divide these twenty robots into two groups, one group includes robots having their projection modules operative within a wavelength range from 845 nm to 850 nm, and the other group will include robots having their projection modules operative within a wavelength range from 852 nm to 864 nm.

Once the groups have been determined by processor 210, it stores in storage 230 information that relates to the association of each robot with its respective group.

Next, based on the number of robots $110_1$ to $110_8$, processor 210 of central unit 120 is configured to determine the length of the time frame during which every robot will typically operate one time. This one time operation per time frame of a certain robot, will be carried out according to the present example during a time slot that has been allocated for two robots, each belonging to a different group, i.e., one robot from the group $110_1$ to $110_4$ and the other robot from the group $110_5$ to $110_8$. The time slot for the operation of these two robots is selected from among a number of time slots comprised in that time frame. Thus, once the length of the time frame has been determined, it is divided into a plurality of time slots, each allocated for the operation of another pair of robots. The number of time slots is preferably equal to the number of robots included in a group which is associated with the largest number of robots from among the plurality of groups.

However, as will be appreciated by those skilled in the art, the above disclosure is merely an example demonstrating an embodiment of the invention, and other options may be exercised. For example, the time slots comprised within a single time frame are not equal in their duration, so that the operational time slot allocated to a certain pair of robots may be shorter from the operational time slot allocated to another pair of robots, e.g., depending on the tasks which these specific robots should carry out.

Then, processor 210 establishes a starting point for the time frame, and synchronizes that starting point for all robots. The synchronization of the time frame starting point can be done in any one of a number of ways, for example by using transmitter 220 to broadcast a message to all operative robots. Alternatively, it can be done by establishing a communication link between central unit 120 and a specific robot out of robots $110_1, 110_2 \ldots 110_{20}$. The link may a wireless link, or alternatively a physical link when the specific robot accesses central unit 120. The establishment of such a communication link may be affected once every pre-defined time period, for eample it may be affected between once an hour to once a day, typically, depending on the drift of the robot's clock.

Preferably, processor 210 is configured to determine a combination for the rate of the time frames and the robots' operational times (exposure times) that will enable the splitting the frame time slots between the plurality of sensors. In order to further demonstrate the above, let us assume that for 20 operational robots and for a frame rate of 20 time frames per second, time frames of 50 msec each are determined. In each 50 msec time frame of this example, a msec, time slot is allocated to each pair of the 20 robots, where each pair includes one robot selected from among the group of robots $110_1$ to $110_{10}$ (i.e., the group that consists robots having projecting modules operating with the wavelength range of 845 nm to 850 nm), and the other robot of that pair is selected from among the group of robots $110_{11}$ to $110_{20}$ (i.e., the group that consists robots having projecting modules operating with the wavelength range of 852 nm to 864 nm.). Out of the 5 msec allocated for each robot, a 4 msec period is available for the operation of that robot's optical sensor, and the remaining 1 msec out of the 5 msec allocated time slot, is used as a slack time, i.e., the amount of time a task can be delayed without causing the operation of another robot to be delayed.

Still, there are some challenges with the implementation of the above disclosure, mainly, the synchronization of the time base for the various operative robots and overcoming the problem of time drifts that occur while the different robots operate.

As described hereinabove, the present solution offers a number of ways to overcome these problems, among which is the establishment of communication link between the robots and the central unit. The communication link may be affected by having each robot access the central unit every predefined period of time (e.g., every hour, every day, etc.) where the central unit identifies the robot (e.g., by a barcode associated therewith) and provides the robot with information required for its operation, Alternatively, the communication link may be established by transmitting broadcast messages to all the robots, from which each robot may retrieve information that is shared by all robots (e.g., time frame starting point) and optionally information directed to that robot specifically (such as information that relates to its time slot allocation). This can be done for example, by including in the broadcasted message, the robot's identification followed by information that is destined to that robot.

Figure 3:
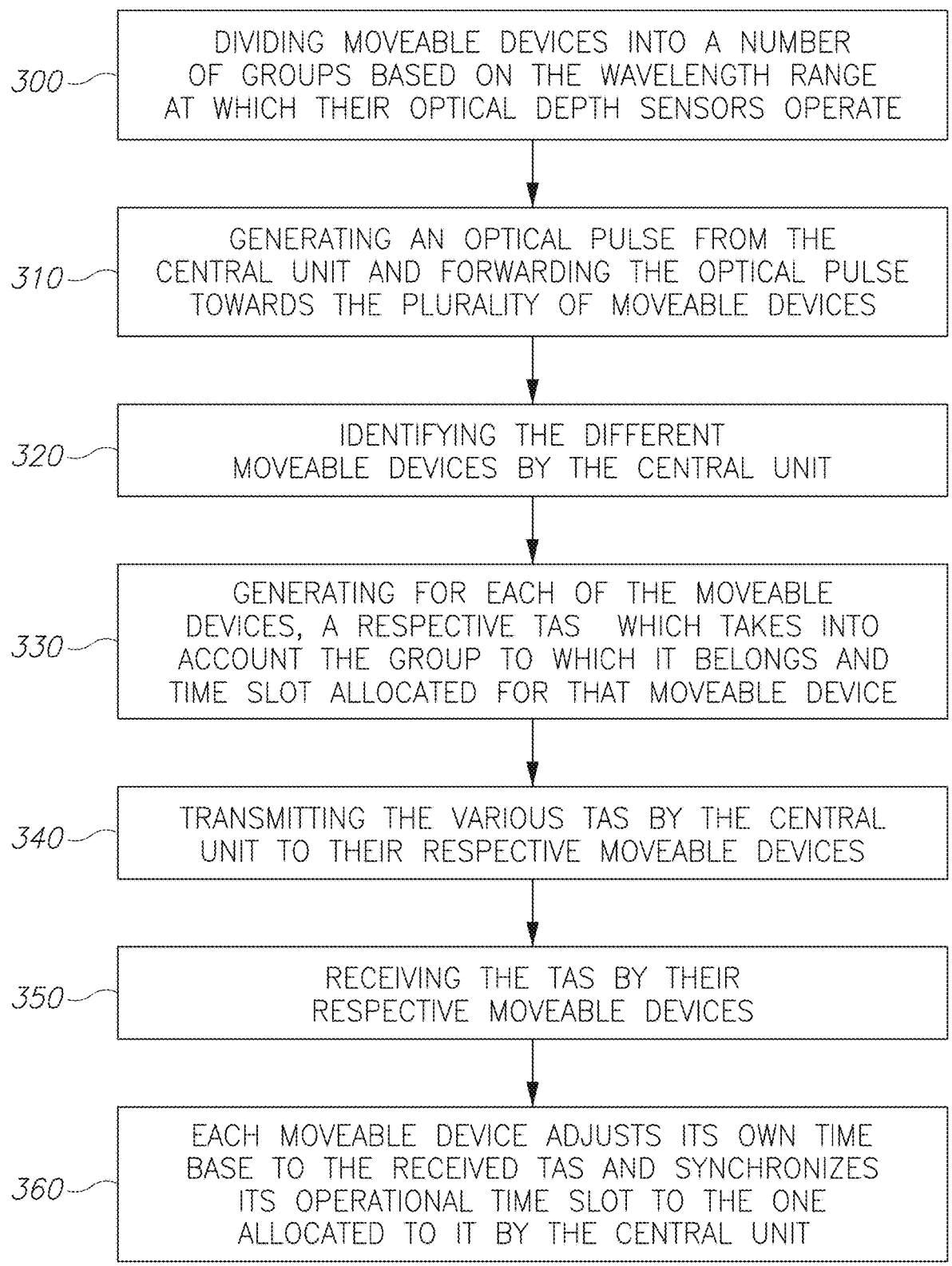
FIG. 3—presents a method for carrying out an example of mitigating interferences between optical sensors comprised in moveable devices of the system depicted in FIG. 1.

FIG. 3 demonstrates a flow chart of an example of a method construed in accordance with an embodiment of the present invention.

First, moveable devices such as drones, robots, etc. that should operate within a given area such as a warehouse, are divided into a number groups, based on the wavelength range at which their respective projecting modules are operative (step 300).

Next, at the central unit an optical pulse is generated and forwarded towards the moveable devices. Optionally, the optical Pulse is at the frequency of the number of time frames per second (fps) implemented in the system for the operation of the moveable devices. The optical pulse will typically have a Near Infra-Red (NIR) wavelength. This optical pulse is then utilized by the different moveable devices as a time alignment signal (step 310).

The central unit identifies the different moveable devices (e.g., by the barcodes associated with them) (step 320) and generates for each moveable devices its respective time alignment signal (hereinafter "TAS") which takes into account the group of moveable devices to which each moveable device belongs and the corresponding time slot allocated for the optical depth sensor of the respective moveable device (step 330).

The respective TAS are transmitted by the central unit to the various moveable devices (step 340) and upon receiving a TAE transmitted by the central unit (step 350), each of the plurality of moveable devices adjusts own time base to the TAO provided for it by the central unit (e.g., by using its voltage-controlled oscillator (VCO)) and synchronizes its operational time slot to the one allocated for its operation by the central unit (step 360).

At this point, the moveable devices are able to operate within the confined space, without being subjected to optical interferences that will adversely affect their operation.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A central unit configured to operate in a system that comprises a plurality of moveable devices, each comprising at least one optical depth sensor,
   wherein the central unit is characterized in that it comprises at least one processor adapted to:
   divide the plurality of moveable devices into a plurality of groups, wherein each of the plurality of groups is characterized by a specific wavelength range at which all projecting modules associated with the optical depth sensors of the moveable devices belonging to said group, are configured to operate;
   establish a time frame within which each of the plurality of optical depth sensors of the moveable devices are able to operate, wherein said time frame comprises a plurality of time slots; and
   associate at least two of the moveable devices with a single time slot, wherein each of said at least two moveable devices belongs to a different group from among said plurality of groups.

2. The central unit of claim 1, wherein in case there are fewer moveable devices associated with a first group of said plurality of groups than moveable devices associated with a second group of said plurality of groups, said at least one processor is configured to enable allocation of two or more time slots within a single time frame to one moveable device that belongs to said first group.

3. The central unit of claim 1, said at least one processor is configured to allocate a time slot from among the plurality of time slots comprised within a single time frame, to moveable devices, each selected from a different group of the plurality of groups, and wherein no more than one time slot is allocated to a single moveable device.

4. The central unit of claim 1, wherein said at least one processor is configured to establish a number of time frames per second, a length of each time frame and a number of the plurality of time slots.

5. The central unit of claim 1, further comprising a transmitter configured to enable communication between the plurality of moveable devices and said central unit.

6. The central unit of claim 5, wherein the communication between the plurality of moveable devices and said central unit is adapted to enable synchronizing a start of time frames for the plurality of moveable devices and to overcome time drifts while operating said plurality of moveable devices.

7. The central unit of claim 6, wherein once communication is established between the central unit and one of the plurality of moveable devices, the central unit is configured to identify a moveable device being in communication with the central unit.

8. The central unit of claim 6, wherein communications are broadcasted by the central unit to the plurality of moveable devices and wherein each of said communications includes an identification of a specific moveable device and information required for the operation of that specific moveable device.

9. The central unit of claim 5, wherein the transmitter is an optical transmitter, configured to transmit optical signals towards the plurality of moveable devices.

10. The central unit of claim 5, wherein the transmitter is a wireless transmitter, configured to transmit radio frequency signals towards die plurality of moveable devices.

11. The central unit of claim 1, wherein said moveable devices are members selected from a group that consists of robots, drones and any combination thereof.

12. A method for mitigating interferences between optical depth sensors operating in a system that comprises a central unit and a plurality of moveable devices, wherein each of the plurality of moveable devices comprises at least one optical depth sensor, lie method comprises the steps of:
   dividing the plurality of moveable devices into a plurality of groups, wherein each of the plurality of groups is characterized by a specific wavelength range at which all projecting modules associated with optical depth sensors of respective moveable devices that belong to said group, are configured to operate;
   establishing a time frame within which each of the plurality of optical depth sensors of the moveable devices are able to operate, and wherein said time frame comprises a plurality of time slots; and associating at least two of the moveable devices with a single time slot, wherein each of said at least two moveable devices belongs to a different group from among said plurality of groups.

13. The method of claim 12, wherein in case there are fewer moveable devices associated with a first group of the plurality of groups than moveable devices associated with a second Group of said plurality of groups, the method further comprising a step of allocating two or more time slots within a single time frame to one moveable device that belongs to the first group.

14. The method of claim 12, further comprising a step of allocating a time slot from among the plurality of time slots comprised within a single time frame, to moveable devices, wherein each moveable device is selected from a different group of the plurality of groups, and wherein no more than one time slot is allocated to a single moveable device.

15. The method of claim 12, further comprising the steps of:

transmitting, by the central unit, signals towards the plurality of moveable devices, wherein the signals identify a time base for the operation of the optical depth sensors, a number of time frames to be implemented within a pre-defined period of time, and time slots within the time frames allocated to each of the optical depth sensors; and upon receiving the signals transmitted by the central unit, each of the plurality of moveable devices adjusts a time base for operation of its own optical depth sensor to the one provided by the central unit and synchronizes its operational time slot to the one allocated for its operation.

* * * * *